US008168044B2

(12) United States Patent
Weigelt

(10) Patent No.: US 8,168,044 B2
(45) Date of Patent: May 1, 2012

(54) THERMOCHEMICAL REACTOR FOR A SELF-PROPELLED HARVESTING VEHICLE

(75) Inventor: Horst Weigelt, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 363 days.

(21) Appl. No.: 12/556,960

(22) Filed: Sep. 10, 2009

(65) Prior Publication Data

US 2010/0077711 A1    Apr. 1, 2010

(30) Foreign Application Priority Data

Sep. 29, 2008   (DE) .......................... 10 2008 049 350

(51) Int. Cl.
*B01D 3/00* (2006.01)
*B01J 19/00* (2006.01)
*C10B 19/00* (2006.01)

(52) U.S. Cl. .......... 202/83; 422/209; 422/210; 422/198; 202/117; 202/217; 202/218; 202/222; 56/1; 56/16.4 B

(58) Field of Classification Search ............... 422/209, 422/210, 198; 202/83, 117, 217, 218, 222; 56/1, 16.4 B See application file for complete search history.

(56) References Cited

U.S. PATENT DOCUMENTS

| 3,824,054 | A | * | 7/1974 | Harris ........................ 425/149 |
| 4,781,796 | A | * | 11/1988 | Bridle et al. ................. 202/117 |
| 5,542,962 | A | * | 8/1996 | Ollerenshaw et al. ........... 71/10 |
| 2008/0093209 | A1 | * | 4/2008 | Noto ............................... 201/7 |

FOREIGN PATENT DOCUMENTS

| DE | 103 45 842 | 4/2005 |
| DE | 10 2004 003 011 | 8/2005 |
| WO | WO 2006117006 | * 11/2006 |

* cited by examiner

*Primary Examiner* — Walter D Griffin
*Assistant Examiner* — Lessanework Seifu
(74) *Attorney, Agent, or Firm* — Michael J. Striker

(57) ABSTRACT

A thermochemical reactor includes a contact surface and a pressing device for pressing raw material to be pyrolyzed against the rotationally symmetrical contact surface which is rotatable relative to the raw material. A generating line of the contact surface is oriented at an angle to a radius that is perpendicular to the axis of the relative rotation.

15 Claims, 3 Drawing Sheets

THERMOCHEMICAL REACTOR FOR A SELF-PROPELLED HARVESTING VEHICLE

CROSS-REFERENCE TO A RELATED APPLICATION

The invention described in claimed herein below is also described in German patent application DE 10 2008 049 350.3 filed on Sep. 29, 2008. This German patent application, whose subject matter is incorporated here by reference, provides the basis for a claim of priority of invention under 35 U.S.C. 119 (a-d).

BACKGROUND OF THE INVENTION

The present invention relates to a thermochemical reactor for extracting gaseous or liquid fuel from a raw material, preferably from biomass, via pyrolytic conversion.

In the light of a forseeable shortage of fossil fuels and the effects of their use on the climate, the public interest in the utilization of sustainable raw materials, i.e., biomass, as an energy source is increasing. One problem that is associated with the use of biomass as an energy source is its water content which is usually high. Fresh vegetable biomass generally has a water content that is so high that the attainable yield of fuel does not cover the costs and energy required to harvest and haul the biomass to a stationary pyrolysis unit. If it is possible to harvest biomass when it is dry, the ratio of yield to cost is better since the costs to transport the high water content are eliminated. Climatic conditions must be favorable in order for this to take place, however, and it is generally practical for use only with annual plants which die off and dry on the field after the fruit ripens. In order to also process fresh biomass cost-effectively, ways must be found to reduce the hauling costs. One approach is to process the biomass into fuel directly in the field. DE 10 2004 003 011 A1 describes, for this purpose, a vehicle that is capable of traveling on fields and includes several installed processing modules, including one used to press juices from harvested plant material, and one used to process the dried substance obtained from the plant material into a fractional raffinate, the fractions of which should consist of gasoline, diesel oil, or heavy oil. No information is provided regarding the design of the latter module.

A thermochemical reactor which may be used to extract fuel from dehydrated plant material in a vehicle that is capable of traveling on fields must be compact and capable of performing the conversion rapidly so that the plant material may be further processed at the same rate at which it is harvested. In addition, it should be possible for the reactor to operate continually.

A method that appears to meet these requirements is ablative flash pyrolysis, in the case of which material to be pyrolyzed is pressed against a hot surface where it chars while the material and the surface move relative to one another. A device for performing ablative flash pyrolysis that includes a contact surface and a pressing device for pressing raw material to be pyrolyzed against the rotationally symmetrical contact surface which is rotatable relative to the raw material is described, e.g., in DE 103 45 842 A1.

In the case of this known device, the contact surface is formed by a disk which rotates about an axis, and the raw material is pressed onto the surface in a direction that is parallel to the axis. The problem results that it is difficult to ensure an even temperature distribution on the disk which is heated by the burner, on its side facing away from the raw material, and that the speed at which the disk and raw material move relative to one another depends on the distance between the contact point and the rotational axis of the disk. To attain a high raw material throughput rate, the largest possible portion of the surface of the disk should be used for the conversion. The greater this portion is, the greater the radius range is across which the contact surface extends, and the more non-uniform the conditions are under which the conversion takes place, thereby making it that much more difficult to control the process.

SUMMARY OF THE INVENTION

One object of the present invention, therefore, is to create a thermochemical reactor for ablative flash pyrolysis which attains uniform reaction conditions on the entire contact surface between the raw material and the contact body, and makes good use of the available surface of the contact body.

The object is attained by the fact that, in the case of a thermochemical reactor which includes a reaction body that is rotatable about an axis and on which the pyrolysis reactions take place, and which includes a pressing device for pressing raw material to be pyrolyzed against a contact surface of the reaction body, the contact surface represents at least a portion of a circumferential surface of the reaction body. Due to this design, the variability of the relative speed between the contact surface and the raw material is reduced across the cross section of the contact between the two, as compared to the known contact disk. It is therefore possible to provide a large contact surface having homogeneous reaction conditions in one compact design.

When the contact surface is cylindrical, the relative speed between the raw material and the contact surface is constant across the entire contact cross section.

Preferably, a container for non-compacted raw material is provided above the reaction body, and the pressing device includes a raw material channel which extends from the bottom of the container to the contact surface. New raw material from the container may therefore enter the pressing device solely under the force of gravity.

A pair of conveying rollers may be installed at the entrance to the raw material channel in order to generate the pressing force required to convert the raw material efficiently and quickly.

As an alternative, a conveyor auger may also be provided in the raw material channel.

The raw material channel is preferably tapered toward the contact surface so that the raw material is progressively compacted as it advances in the channel, and so that pockets which may still be present in the raw material in an upstream region of the channel become smaller and smaller, and preferably disappear completely, as the raw material approaches the contact surface. Air and oxygen that may be present in the pockets in the raw material are therefore prevented from reaching the contact surface, and undesired oxidation reactions on the contact surface may be prevented or at least limited. The tapering may be limited to one cutting plane, i.e., it may be prism-shaped, or it may take place in two cutting planes, i.e., it may have the shape of a pyramid or a funnel.

It is particularly expedient when several contact surfaces on one support body are staggered in the direction of its rotational axis and may be supplied with raw material via one of the raw material channels which each lead into one of the contact surfaces. It is possible to make different use of surface regions of the reaction body between the contact surfaces, as described below, and several adjacently located, narrow, tapered conveyor channels require less overall length in order to attain a desired compaction of the raw material than does a single wide channel, so that, as a result, the large number of channels and contact surfaces makes it possible to attain a compact design of the reactor. Finally, several raw material channels that are adjacent to one another in the axial direction may be supplied with raw material easily and efficiently via the same axially parallel pair of conveying rollers.

In order to make good use of the expansion of the contact surface, several raw material channels are preferably provided, which are staggered in their circumferential direction and lead onto the same contact surface.

In order to minimize the mass of the reaction body, the reaction body advantageously encloses a hollow space.

The reaction products that are produced in the contact pyrolysis are initially gaseous or solid. In order to separate solid components from a stream of reaction products using a space-saving design, the surface of a hollow reaction body may be advantageously and partially designed as a particle separator, in particular in the form of a centrifugal separator or a particle filter, via which the gaseous reaction products may reach an interior cavity of the reaction body. Cleaned reaction products may escape via a discharge line that extends out of the interior cavity.

In the case of a reaction body designed as a centrifugal separator, holes, in particular, in a jacket of the reaction body may be oriented such that reaction products that pass through them are imparted with angular momentum relative to a rotational axis of the reaction body.

An effective, uniform heating of the contact surface may take place via a channel—which is enclosed by the contact surface—for a heat transfer fluid.

This channel may advantageously be located around a support body, in particular in the shape of a ring. In order to avoid unnecessary heat losses toward the support body, a thermal insulation layer is preferably provided between the support body and the channel.

The contact surface is preferably heatable directly or indirectly, via the heat transfer fluid described above, using a burner which is supplied with reaction products from the reactor.

The reactor according to the present invention advantageously includes a delivery device for returning the reaction product to the raw material. This delivery device may serve different purposes. It is possible, for example, by returning hot reaction product, to remove residual moisture from the raw material before it is converted in the reactor. Independently of this, it is possible to use the returned reaction product to displace air from the pockets in the raw material, thereby ensuring that oxygen may not reach the contact surface if all of the pockets are not closed during passage through a raw material channel.

To improve the product yield, quality or efficiency, the contact surface may be provided with a catalyst, in particular a hydrogenation catalyst.

The subject matter of the present invention is also a self-propelled harvesting vehicle comprising a crop material pick-up device and a thermochemical reactor as described above, which is used for the pyrolytic conversion of the crop material that was picked up.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The devices shown in FIG. 1 and which are described in detail below are preferably intended for use in a harvesting vehicle in order to process biomass which has been harvested by the harvesting vehicle while the harvesting vehicle is still in the field. Of course, the devices shown are also suitable for use for other, in particular stationary, applications. It is also feasible to use the device to recycle non-biomass materials, e.g., used plastics.

Figure 1:
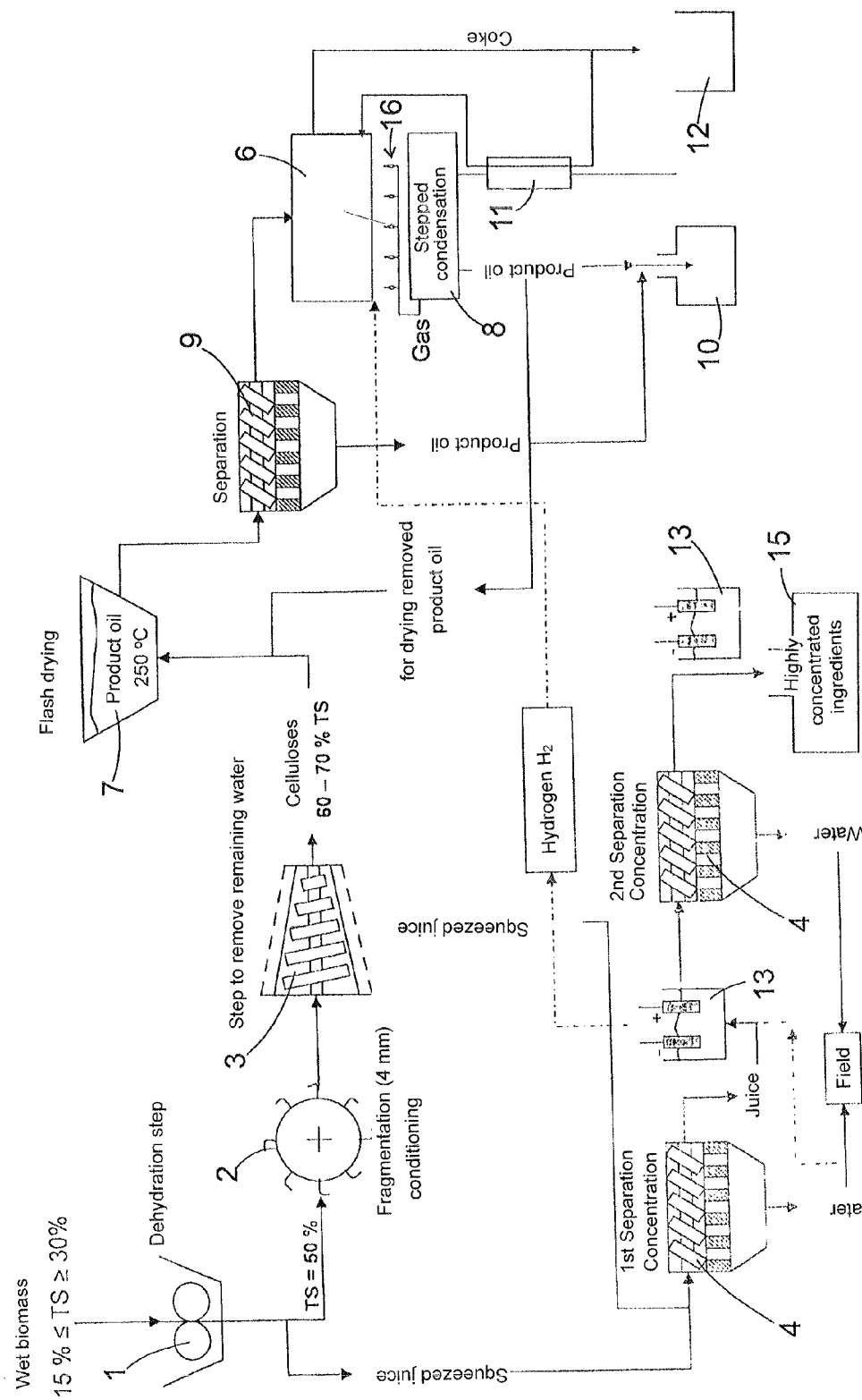
FIG. 1 is a schematic illustration of the processing of the crop material and the devices used for this purpose and which are located on-board a self-propelled harvesting machine.

An external view of the harvesting vehicle is not shown, since its external design—provided it is not that of a conventional combine harvester or a forage harvester—is dictated only by the requirement that the devices shown in FIG. 1 be accommodated therein. Akin to a conventional forage harvester or combine harvester, the harvesting vehicle includes a ground drive, on the front of which a crop material pick-up device is mounted in a replaceable manner. The crop material pick-up device is identical to that of a conventional forage harvester or combine harvester, and it may be used in a replaceable manner thereon and on the harvesting vehicle according to the present invention.

Two compression rollers 1 form a gap toward which the harvested biomass is conveyed by the pick-up device. Depending on the type of plant material involved, when the biomass passes through compression rollers 1, it loses approximately half of its water; while the portion of the dry mass in the freshly picked-up biomass is between 10% and 30%, the portion of dry mass that remains after the biomass passes through compression rollers 1 has increased to 18% to 46%.

The biomass which was pre-dehydrated using compression rollers 1 then passes through a chopping step 2 which, as in the case of a forage harvester, may include a rotating cutting roller and stationary knives which interact therewith. The fragmentation is more intensive than it is in the case of a forage harvester, e.g. due to the knives being placed more closely together, or due to the biomass remaining in chopping step 2 for a longer period of time, with the result that, when the material leaves the chopping step, particles having a typical maximum size of 4 mm are obtained.

The fragmentized material obtained in chopping step 2 is sent to a second dehydration step 3, e.g. a decanter or a sieve centrifuge. In conjunction with the intensive fragmentation, this steps makes it possible to increase the portion of dry mass to 88% to 98%. A fibrous, cellulose-rich solid material is obtained in this manner, the mass of which now comprises only approximately 10% to 30% of the biomass that was originally picked up.

The dehydrated material that was output in second dehydration step 3 passes through a drying step 7 and a separating step 9 before it is delivered to a flash pyrolysis reactor 6. This reactor is described in detail below with reference to FIGS. 2 through 4. This material is heated in reactor 6 in the absence of air, thereby converting it in a continual process into water, various hydrocarbons, and a residual portion of solid material that is composed essentially of carbon and is referred to as coke. The reaction products that are released as gas at the high temperature of reactor 6 are sent to a condensation step 8 and are condensed into fractions having a different boiling point.

In condensation step 8, non-condensable gas powers burner 16 which heats reactor 6.

Fractionated condensation takes place in condensation step 8; parameters of the fractionation are defined such that a fraction mainly contains all of the water that entered reactor 6 with the biomass and the water created therein via the pyrolysis reactions, while at least one further fraction which is referred to as product oil is composed mainly only of hydrocarbons. The product oil that is obtained is collected in a tank 10, except for a portion, preferably a fraction that condenses at a high temperature, which is redirected in entirety or partially to condensation step 8 so that it may be added in drying step 7 to the dehydrated biomass obtained in second dehydration step 3.

Drying step 7 may include kneading or stirring tools for mixing the product oil with the dehydrated biomass. The high temperature of the product oil causes the moisture remaining in the biomass to evaporate, thereby making it possible to remove a mixture of product oil and substantially anhydrous biomass at the outlet of drying step 7.

Before this mixture reaches reactor 6, it passes through a separation step 9 in which the product oil is removed from the biomass under pressure. The product oil which is removed in this manner is collected in tank 10 along with the portion of product oil that was obtained in condensation step 8 and that was not sent to drying step 7.

According to a preferred development, a filter 11 is provided in order to clean the condensate fraction that was obtained in condensation step 8 and that is composed mainly of water. As the filter substrate, filter 11 uses a portion of the coke from reactor 6 which is conveyed continually through filter 11 in the counter-flow to the aqueous fraction, thereby saturating the aqueous fraction with the organic components. The water that is obtained via filtration may be deposited onto the field if necessary, after undergoing a post-cleaning step; the coke that is saturated with the organic portions may be collected together with the remaining coke from reactor 6 in a bunker 12, as the combustible material, or, depending on the extent of its saturation with water or organic material, it may be returned directly to reactor 6, as shown in FIG. 1, or it may be returned by the long route via drying step 7, to remove the organic components via distillation in reactor 6 and to add them to the product oil.

According to another development of the present invention, an electrolysis cell 13 is provided, which is supplied with the concentrated portion obtained in concentration step 4. Frequency-modulated direct current is applied to electrolysis cell 13 in order to obtain a high yield of hydrogen using less energy. The hydrogen obtained via electrolysis is supplied to pyrolysis reactor 6. The increase in the hydrogen supply in reactor 6 attained in this manner improves the conversion of the oxygen bound in the biomass to water, thereby yielding an oil from the flash pyrolysis that contains less oxygen and is therefore of higher quality.

Figure 2:
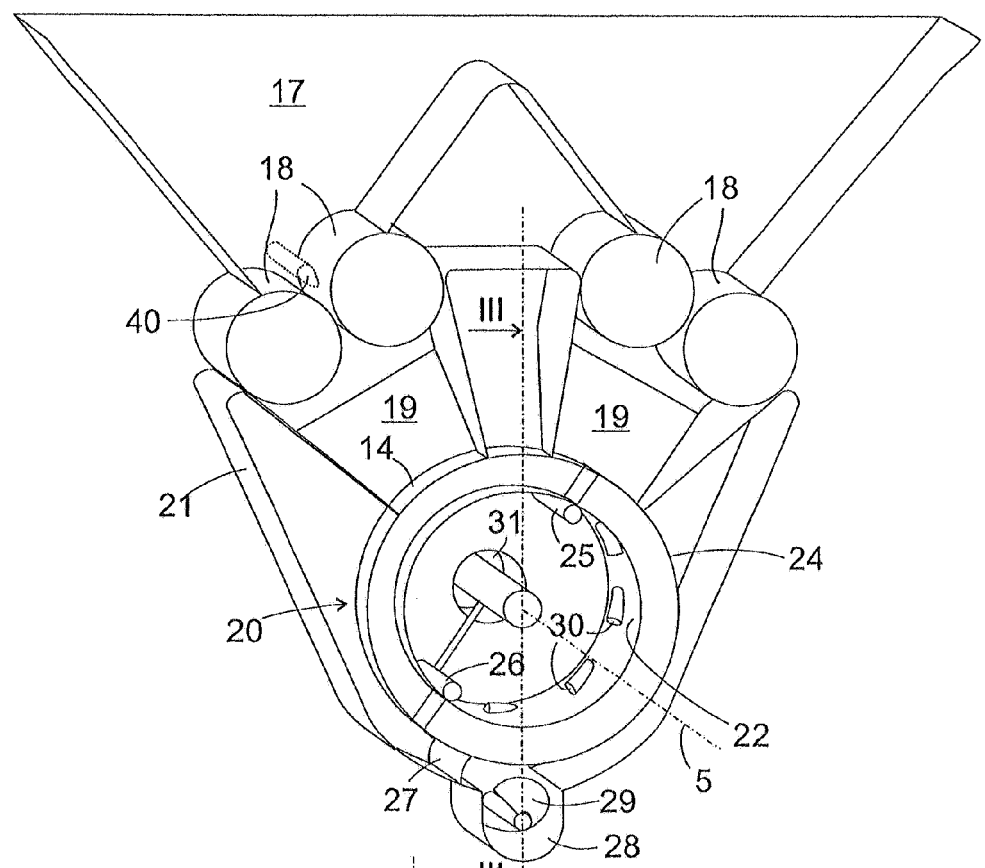
FIG. 2 shows a radial cross section through the thermochemical reactor according to the present invention.
Figure 3:
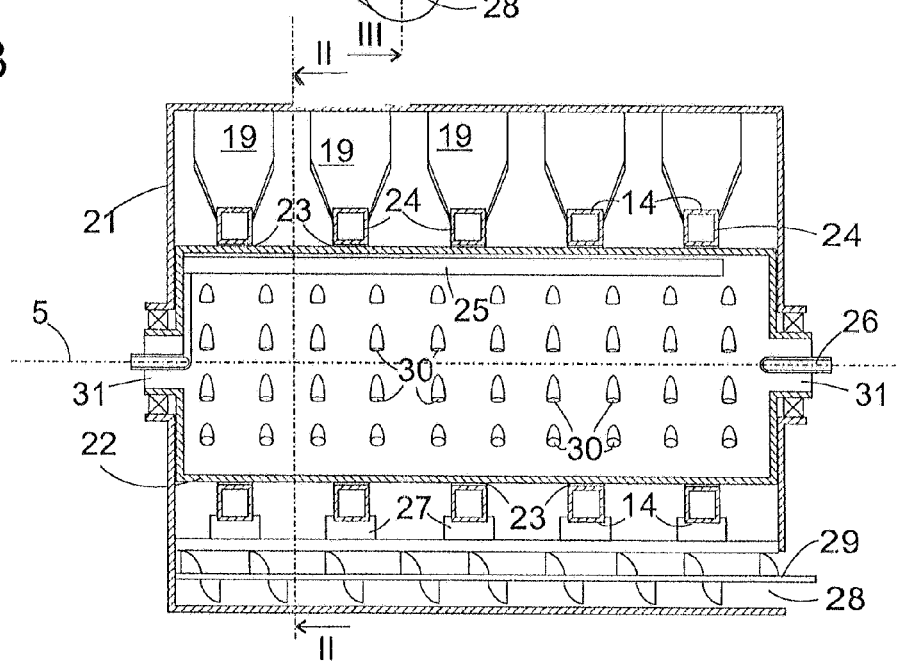
FIG. 3 shows a longitudinal cross-section through the reactor shown in FIG. 2.

FIGS. 2 and 3 show schematic cross sections through reactor 6 in two planes which are perpendicular to one another. A hopper 17 is located in the upper region of reactor 6, and it receives the biomass which has been output from separating step 9, dried, and largely freed of product oils which were previously added. Two pair of oppositely rotationally driven conveyor rollers 18 having parallel rotational axes are located on the bottom of hopper 17. The biomass that lies on rollers 18 is drawn via the rotation of conveyor rollers 18 and is delivered to a gap between conveyor rollers 18. A plurality of channels 19 which are staggered in the axial direction of conveyor rollers 18 abut the bottom of each pair of conveyor rollers 18; two of the channels 19 are shown in the cross-sectional view in FIG. 2. Closed-walled channels 19 which taper downward in the shape of a pyramid deliver the biomass to a reaction body—a reactor drum 20 in this case—which is also rotationally driven. Reactor drum 20 is accommodated in a reactor housing 21 into which channels 19 extend, and which blocks the entry of atmospheric air.

Reactor drum 20 includes a hollow support cylinder 22 on which heat exchanger rings 24 are mounted; heat exchanger rings 24 are shielded by an insulation layer 23, are staggered in the axial direction, and are separated from one another. Every heat exchanger ring 24 includes two semicircular pipe sections through which a heat transfer fluid such as a silicon oil which has been warmed using a burner 16 outside of reactor housing 21 is circulated at a temperature of approximately 450° C. Supply and discharge lines for the heat transfer fluid, between which heat exchanger rings 24 are connected in parallel in terms of flow, are labeled with reference numerals 25 and 26, respectively.

As shown clearly in FIGS. 2 and 3, channels 19 taper markedly from conveyor rollers 18 to heat exchanger ring 24. Via the tapering, the biomass is compacted further the closer it gets to heat exchanger ring 24, thereby ensuring that air pockets do not reach the surface of heat exchanger rings 24, or they do so to a negligible extent. It is not necessary to compact the biomass to the extent that all air pockets are eliminated; in particular when the biomass has been dried via the addition of product oil before it enters hopper 17, the product oil that remains fills more and more of the pockets as the biomass advances in channel 19, thereby making it possible to remove substantially all of the atmospheric oxygen from the biomass before it comes in contact with heat exchanger ring 24. Outer surface 14 of heat exchanger ring, against which the biomass is pressed, is cylindrical. Designs of the reaction surface that deviate from an exact cylindrical shape are also possible, but if there is a deviation from the cylindrical shape, the difference between the radii of the point on contact surface 14 that is furthest from axis 5 and the point on contact surface 14 that is closest to axis 5 should be smaller than the expansion of contact surface 14 in the direction of axis 5.

According to a variant in which drying is not carried out by adding hot product oil, it is possible to provide an injection line 40 for the product oil or gas, as indicated in FIG. 2 using a dashed line. This injection line extends approximately above the intake gap formed by two conveying rollers 18, and the product oil or gas that is ejected from it such that it is distributed across the length of the intake gap displaces air out of the pockets in the biomass that is drawn in, so that the biomass enters channel 19 substantially free of atmospheric oxygen.

When the biomass comes in contact with outer surface 14 of heat exchanger ring 24, it chars within a few seconds, and the gasses that are produced become distributed in reactor housing 21.

Reactor drum 20 is driven slowly in a rotating manner, thereby ensuring that fresh parts of outer surface 14 of heat exchanger ring 24 constantly come in contact with the biomass that is delivered. To remove incrustations that may form when the biomass chars on outer surface 14, a doctor blade 27 is activated on heat exchanger ring 24 in a lower region of reactor housing 21. Incrustations that are scraped off fall into a trough 28 in the bottom of reactor housing 21 and are ejected out of reactor housing 21 via a conveyor auger 29 rotating in trough 28. The incrustations are a portion of the solid residue of the pyrolysis process referred to as pyrolysis coke, and they may be used as fuel.

As shown in FIG. 3 in particular, reactor drum 20 between two heat exchanger rings 24 includes a plurality of holes 30 which are shaped in order to impart angular momentum—relative to the rotational axis of reactor drum 20—to the pyrolysis gasses that pass through. As a result, the gasses in the interior of support cylinder 22 circulate before they exit via a neck 31 on a front end of support cylinder 22 and reach condensation step 8. Support cylinder 22 therefore acts as a cyclone separator, on the inner surface of which particles contained in the pyrolysis gas collect.

Figure 4:
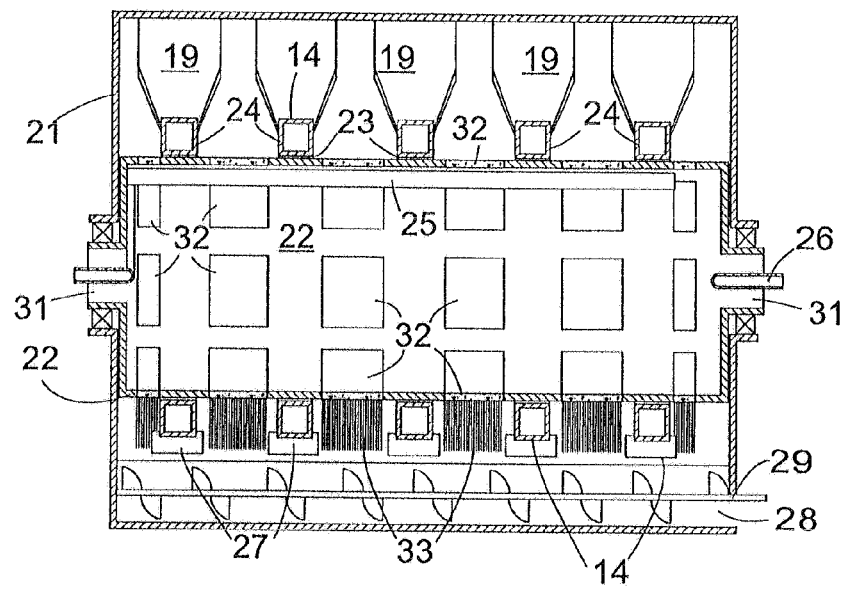
FIG. 4 shows a partial cross section through a reactor according to a second embodiment of the present invention.

According to a second embodiment shown in FIG. 4, in a step that is analogous to FIG. 3, support cylinder 22 includes large surface-area openings between heat exchanger rings 24, which are filled with a filter, e.g., plates 32 of a porous ceramic material. The size of plates 32 depends on the requirements on the mechanical loading capacity of drum 20; in a borderline case, the jacket surface of reactor drum 20 may be composed entirely of the ceramic material, even in the regions enclosed by heat exchanger rings 24.

In this second embodiment, the solid particles that are contained in the pyrolysis gas that is released on outer surfaces 14 of heat exchanger rings 24 are separated out on the outside, on filter plates 32, and, analogous to doctor blades 27 that clean outer surfaces 14, doctor blades or brushes 33 may be provided in order to scrape the particles off of plates 32 near the bottom of reactor housing 21. The coke particles that are scraped or brushed off of filter plates 32 are then removed from reactor housing 21 via conveyor auger 29 together with the material that formed on heat exchanger rings 24 and was scraped off by doctor blades 27.

Figure 5:
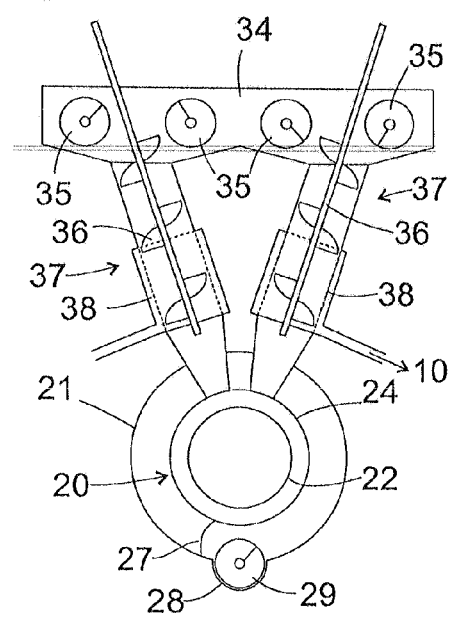
FIG. 5 shows a partial cross section through a reactor according to a third embodiment of the present invention.

FIG. 5 shows a partial cross section through a reactor according to a third embodiment of the present invention. A plurality of the components shown in FIG. 1 is integrated in this design. For example, a flat, open shell 34 located in the upper region of the figure functions simultaneously as drying step 7 and a hopper which corresponds to hopper 17 in FIG. 2, and which is used to supply reactor 6. A plurality of augers 35 which mix the biomass with hot product oil that is added extends in shell 34, in alternating directions and transversely to the cutting plane.

Additional conveyor augers 36 having a substantially vertical axis extend into downwardly oriented channels 37 which emerge from the bottom of shell 34 in order to press the biomass to which product oil was added into channels 37 and compact it there. The wall of channels 37 includes a sieve-like structure in a section 38 through which excess product oil from the mass may exit and flow to tank 10. A downstream section 39 of channels 37 tapers toward heat exchanger ring 24 in order to press the biomass into a homogeneous and highly compacted form. Channel 37 therefore functions simultaneously as separating step 9. The design of reaction drum 20 may be the same as that described for the first or second embodiment.

It will be understood that each of the elements described above, or two or more together, may also find a useful application in other types of constructions differing from the type described above.

While the invention has been illustrated and described as embodied in thermochemical reactor for a self-propelled harvesting vehicle, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A thermochemical reactor, comprising
 a reaction body rotatable about an axis and having a contact surface; and
 a pressing device for pressing raw material to be pyrolyzed against said contact surface of said reaction body,
 wherein said contact surface forms at least a portion of a circumferential surface of said reaction body, and
 wherein said pressing device has several raw material channels which lead onto several ones of said contact surfaces which are arranged in a manner selected from the group consisting of being interspaced in a direction of said axis, being staggered in a circumferential direction, and both, and leading into a same one of said contact surfaces.

2. A thermochemical reactor as defined in claim 1, wherein said contact surface of said reaction body is a cylindrical contact surface.

3. A thermochemical reactor as defined in claim 1, further comprising a container for non-compacted raw material located above said reaction body and having a bottom, said pressing device including a raw material channel which extends from said bottom of said container to said contact surfaces.

4. A thermochemical reactor as defined in claim 3, wherein said raw material channel has an entrance, further comprising a pair of conveying rollers located at said entrance to said raw material channel.

5. A thermochemical reactor as defined in claim 4, wherein said conveying rollers have rotation axes that are parallel to said axis of rotation of said reaction body.

6. A thermochemical reactor as defined in claim 3, further comprising a conveyor auger located in said raw material channel.

7. A thermochemical reactor as defined in claim 1, wherein said pressing device has a raw material channel that extends toward said contact surface and tapers toward said contact surface.

8. A thermochemical reactor as defined in claim 1, wherein said reaction body has a surface with a portion configured as a particle separator, further comprising a discharge line provided for filtered gaseous reaction products and extending out of an inner cavity of said reaction body.

9. A thermochemical reactor as defined in claim 1, wherein said reaction body is configured as an element selected from the group consisting of a centrifugal separator and a particle filter.

10. A thermochemical reactor as defined in claim 1, wherein said contact surface includes a channel for a heat transfer fluid.

11. A thermochemical reactor as defined in claim 1, further comprising a delivery device for returning a reaction product to a raw material.

12. A thermochemical reactor as defined in claim 11, wherein said delivery device is located upstream of said pressing device.

13. A thermochemical reactor as defined in claim 1, wherein said contact surface carries a catalyst.

14. A thermochemical reactor as defined in claim 13, wherein said contact surface carries the catalyst which is a hydrogenation catalyst.

15. A self-propelled harvesting vehicle, comprising a crop material pick-up device; and a thermochemical reactor as defined at least in claim 1, which is used for a pyrolytic conversion of a crop material that is picked up.

* * * * *